United States Patent
De Franciscis

(10) Patent No.: US 8,890,454 B2
(45) Date of Patent: Nov. 18, 2014

(54) PHASE LOCKED LOOP BASED TORSIONAL MODE DAMPING SYSTEM AND METHOD

(75) Inventor: Sergio De Franciscis, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 204 days.

(21) Appl. No.: 13/631,011

(22) PCT Filed: Mar. 30, 2011

(86) PCT No.: PCT/EP2011/054963
§ 371 (c)(1),
(2), (4) Date: Oct. 24, 2012

(87) PCT Pub. No.: WO2011/121049
PCT Pub. Date: Oct. 6, 2011

(65) Prior Publication Data
US 2013/0049660 A1    Feb. 28, 2013

(30) Foreign Application Priority Data

Apr. 1, 2010 (IT) ............... CO2010A0010

(51) Int. Cl.
*H02P 6/10*  (2006.01)
*H02P 29/00*  (2006.01)
*H02P 9/10*  (2006.01)
*H02P 21/05*  (2006.01)
*H02P 9/00*  (2006.01)

(52) U.S. Cl.
CPC ............ *H02P 21/05* (2013.01); *H02P 29/0038* (2013.01); *H02P 9/10* (2013.01); *H02P 2009/004* (2013.01)
USPC .................. 318/400.23; 318/400.01; 318/700

(58) Field of Classification Search
CPC .................................. H02P 9/10; H02P 21/05
USPC .................. 318/400.23, 400.01, 700
See application file for complete search history.

(56) References Cited

U.S. PATENT DOCUMENTS 7,173,399 B2 *  2/2007  Sihler et al. ..................... 322/40
2006/0232250 A1  10/2006  Sihler
2009/0009129 A1   1/2009  Markunas

FOREIGN PATENT DOCUMENTS

DE    4427697 A1    2/1995
EP    2073375 A1    6/2009
(Continued)

OTHER PUBLICATIONS

Search Report and Written Opinion from corresponding PCT Application No. PCT/EP2011/054963, dated May 12, 2011.

(Continued)

*Primary Examiner* — David Luo
(74) *Attorney, Agent, or Firm* — GE Global Patent Operation

(57) ABSTRACT

A torsional mode damping controller system is connected to a converter or placed inside the converter. The converter is driving a drive train including an electrical machine and a non-electrical machine. The controller system includes a first input interface configured to receive a first digital signal from a first phase lock device or a first dynamic observer, a second input interface configured to receive a second digital signal from a second phase lock device or a second dynamic observer, and a controller connected to the first and second input interfaces. The controller is configured to receive the first and second digital signals, compare the first digital signal with the second digital signal, generate control data for a rectifier and/or an inverter of the converter, and send the control data to the rectifier and/or to the inverter.

10 Claims, 20 Drawing Sheets

(56) References Cited

FOREIGN PATENT DOCUMENTS

EP 2164165 A1 3/2010
JP H06225457 A 8/1994

OTHER PUBLICATIONS

Office Action from corresponding MX Application No. MX/a/2012/011135, dated May 21, 2013.

Search Report and Written Opinion from corresponding IT Application No. CO20100010, dated Nov. 17, 2010.

Kakinoki, T. et al., "Observer-based Excitation Control of Turbine-Generator Shaft Oscillation", Power Engineering Society Winter Meeting, 2002, IEEE vol. 2, pp. 1225-1230, ISBN:0-7803-7322-7.

Sihler, Christof et al., "Torsional Mode Damping For Electrically Driven Gas ompression Trains in Extended Variable Speed Operation", Proceedings of the Thirty-Eighth Turbomachinery Symposium, 2009, pp. 81-92.

* cited by examiner

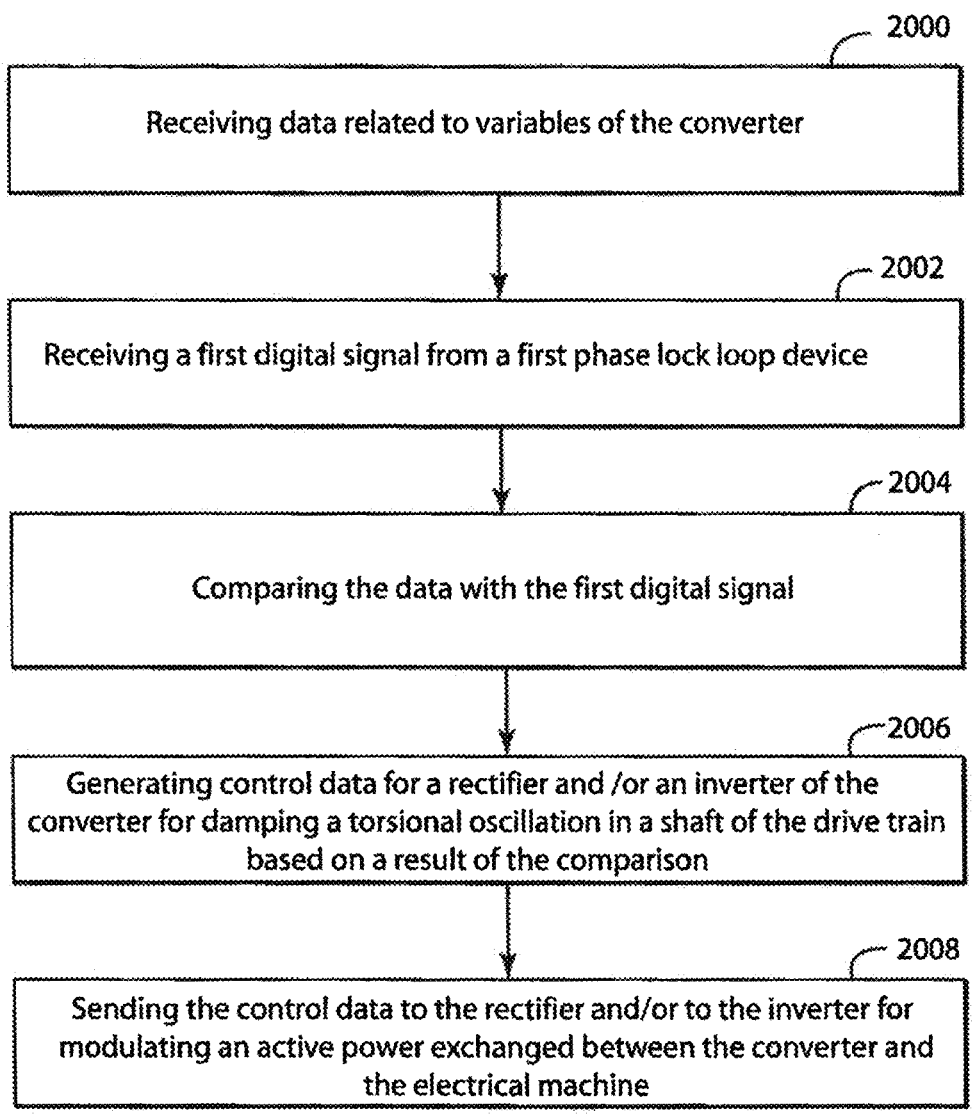

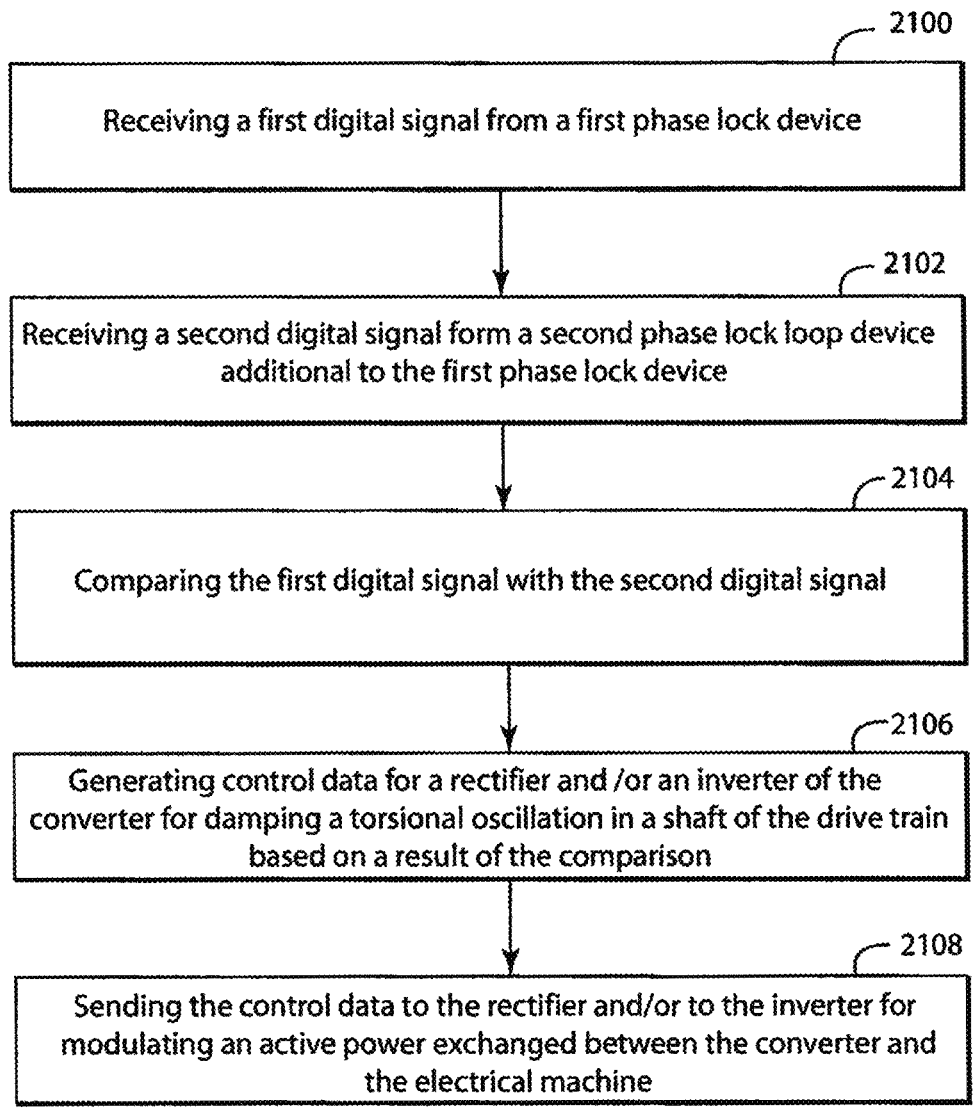

PHASE LOCKED LOOP BASED TORSIONAL MODE DAMPING SYSTEM AND METHOD

CROSS REFERENCE TO RELATED APPLICATIONS

This is a national stage application under 35 U.S.C. §371 (c) of prior-filed, co-pending PCT patent application serial number PCT/EP2011/054963, filed on Mar. 30, 2011, which claims priority to Italian Patent Application Serial No. CO2010A000010, filed on Apr. 1, 2010, the entire contents of which are incorporated herein by reference.

BACKGROUND OF THE INVENTION

Embodiments of the subject matter disclosed herein generally relate to methods and systems and, more particularly, to mechanisms and techniques for dampening a torsional vibration that appears in a rotating system.

The oil and gas industry has a growing demand for driving various machines at variable speeds. Such machines may include compressors, electrical motors, expanders, gas turbines, pumps, etc. Variable frequency electrical drives increase energy efficiency and provide an increased flexibility for the machines. For example, a mechanism for driving a large gas compression train is the load commutated inverter (LCI). A gas compression train includes, for example, a gas turbine, a motor, and a compressor. The gas compression train may include more or less electrical machines and turbo-machines. However, a problem introduced by power electronics driven systems is the generation of ripple components in the torque of the electrical machine due to electrical harmonics. The ripple component of the torque may interact with the mechanical system at torsional natural frequencies of the drive train, which is undesirable.

A torsional oscillation or vibration is an oscillatory angular motion that may appear in a shaft having various masses attached to it as shown for example in FIG. 1. FIG. 1 shows a system 10 including a gas turbine 12, a motor 14, a first compressor 16 and a second compressor 18. The shafts of these machines are either connected to each other or a single shaft 20 is shared by these machines. Because of the impellers and other masses distributed along shaft 20, a rotation of the shaft 20 may be affected by torsional oscillations produced by the rotation with different speeds of the masses (impellers for example) attached to the shaft.

As discussed above, the torsional vibrations are typically introduced by the power electronics that drive the electrical motor. FIG. 1, for example, shows a power grid source (power source) 22 providing electrical power to the LCI 24, which in turn drives the shaft 20 of the motor 14. The power grid may be an isolated power generator. in order to damp (minimize) the torsional vibrations, as shown in FIG. 2 (which corresponds to FIG. 1 of U.S. Pat. No. 7,173,399, assigned to the same assignee as this application, the entire disclosure of which is incorporated here by reference), an inverter controller 26 may be provided to an inverter 28 of the LCI 24 and may be configured to introduce an inverter delay angle change ($\Delta\beta$) for modulating an amount of active power transferred from inverter 28 to motor 14. Alternatively, a rectifier controller 30 may be provided to a rectifier 32 and may be configured to introduce a rectifier delay angle change ($\Delta\alpha$) for modulating the amount of active power transferred from the generator 22 to a DC-link 44 and thus to the motor 14. It is noted that by modulating the amount of active power transferred from the generator 22 to the motor 14 it is possible to damp the torsional vibrations that appear in the system including motor 14 and compressor 12. In this regard, it is noted that shafts of motor 14 and gas turbine 12 are connected to each other while a shaft of generator 22 is not connected to either the motor 14 or compressor 12.

The two controllers 26 and 30 receive as input, signals from sensors 36 and 38, respectively, and these signals are indicative of the torque experienced by the motor 14 and/or the generator 22. In other words, the inverter controller 26 processes the torque value sensed by sensor 36 for generating the inverter delay angle change ($\Delta\beta$) while the rectifier controller 30 processes the torque value sensed by the sensor 38 for generating the rectifier delay angle change ($\Delta\alpha$). The inverter controller 26 and the rectifier controller 30 are independent from each other and these controllers may be implemented together or alone in a given system. FIG. 2 shows that sensor 36 monitors a part (section) 40 of the shaft of the motor 14 and sensor 38 monitors a shaft 42 of the power generator 22. FIG. 2 also shows the DC link 44 between the rectifier 32 and the inverter 28.

However, it is possible to use other devices and methods for generating damping in the drive train.

BRIEF DESCRIPTION OF THE INVENTION

According to an embodiment of the present invention, a controller system is provided. The controller system is connected to a converter or placed inside the converter itself. The converter drives a drive train including an electrical machine and a non-electrical machine. The controller system includes an input interface configured to receive converter data related to variables of the converter and a controller connected to the input interface. The input interface is configured to receive a first digital signal from a first phase lock loop device or a dynamic observer, receive the converter data from the converter, compare the converter data with the first digital signal, generate control data for a rectifier and/or an inverter of the converter for damping a torsional oscillation in a shaft of the drive train based on a result of the comparison, and send the control data to the rectifier and/or to the inverter for modulating an active power exchanged between the converter and the electrical machine.

According to another embodiment of the present invention, a torsional mode damping controller system is provided. The controller system is connected to a converter or placed inside the converter itself. The converter drives a drive train including an electrical machine and a non-electrical machine. The controller system a first input interface configured to receive a first digital signal from a first phase lock device or a first dynamic observer; a second input interface configured to receive a second digital signal from a second phase lock device or a second dynamic observer; and a controller connected to the first and second input interfaces. The controller is configured to receive the first and second digital signals, compare the first digital signal with the second digital signal, generate control data for a rectifier and/or an inverter of the converter for damping a torsional oscillation in a shaft of the drive train based on a result of the comparison, and send the control data to the rectifier and/or to the inverter for modulating an active power exchanged between the converter and the electrical machine.

According to another embodiment of the present invention, a system for driving an electrical machine that is part of a drive train is provided. The system includes a rectifier configured to receive an alternative current from a power source and to transform the alternative current into a direct current; a direct current link connected to the rectifier and configured to transmit the direct current; an inverter connected to the direct current link and configured to change a received direct current into an alternative current; an input interface configured to receive converter data related to variables of the converter; and a controller connected to the input interface. The controller is configured to receive a first digital signal from a first phase lock loop device or a dynamic observer, receive the converter data from the converter, compare the converter data with the first digital signal, generate control data for a rectifier and/or an inverter of the converter for damping a torsional oscillation in a shaft of the drive train based on a result of the comparison, and send the control data to the rectifier and/or to the inverter for modulating an active power exchanged between the converter and the electrical machine.

According to another embodiment of the present invention, a method for damping a torsional vibration in a drive train including an electrical machine is provided. The method includes a step of receiving converter data related to variables of the converter; a step of receiving a first digital signal from a first phase lock loop device or a dynamic observer; a step of comparing the converter data with the first digital signal; a step of generating control data for a rectifier and/or an inverter of the converter for damping a torsional oscillation in a shaft of the drive train based on a result of the comparison; and a step of sending the control data to the rectifier and/or to the inverter for modulating an active power exchanged between the converter and the electrical machine.

According to another embodiment of the present invention, a method for damping a torsional vibration in a drive train including an electrical machine is provided. The method includes a step of receiving a first digital signal from a first phase lock device or a first dynamic observer; a step of receiving a second digital signal from a second phase lock loop device or a second dynamic observer additional to the first phase lock device or the first dynamic observer; a step of comparing the first digital signal with the second digital signal; a step of generating control data for a rectifier and/or an inverter of the converter for damping a torsional oscillation in a shaft of the drive train based on a result of the comparison; and a step of sending the control data to the rectifier and/or to the inverter for modulating an active power exchanged between the converter and the electrical machine.

According to another embodiment of the present invention, a computer readable medium is provided. The computer readable medium includes computer executable instructions, wherein the instructions, when executed, implement a method for damping torsional vibrations. The computer instructions include the steps recited in the method noted in the previous paragraph.

BRIEF DESCRIPTION OF THE DRAWINGS

The accompanying drawings, which are incorporated in and constitute a part of the specification, illustrate one or more embodiments and, together with the description, explain these embodiments, In the drawings:

FIG. 20 is a flow chart illustrating a method for damping torsional vibrations based on a single phase lock loop device according to an exemplary embodiment; and FIG. 21 is a flow chart illustrating a method for damping torsional vibrations based on two phase lock loop devices according to an exemplary embodiment.

DETAILED DESCRIPTION OF EXEMPLARY EMBODIMENTS OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an electrical motor driven by a load commutated inverter. However, the embodiments to be discussed next are not limited to such a system, but may be applied (with appropriate adjustments) to other systems that are driven with other devices, as for example, a voltage source inverter (VSI).

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a torsional mode damping controller may be configured to obtain electrical and/or mechanical measurements regarding a shaft of an electrical machine (which may be a motor or a generator) and/or a shaft of a turbo-machine that is mechanically connected to the electrical machine and to estimate, based on the electrical and/or mechanical measurements, dynamic torque components and/or a torque vibration at a desired shaft location of a drive train. The dynamic torque components may be a torque, a torsional position, torsional speed or a torsional acceleration of the shaft. Based on one or more dynamic torque components, a controller may adjust/modify one or more parameters of a rectifier that drives the electrical machine to apply a desired torque for damping the torque oscillation. As will be discussed next, there are various data sources for the controller for determining the damping based on the rectifier control.

Figure 3:
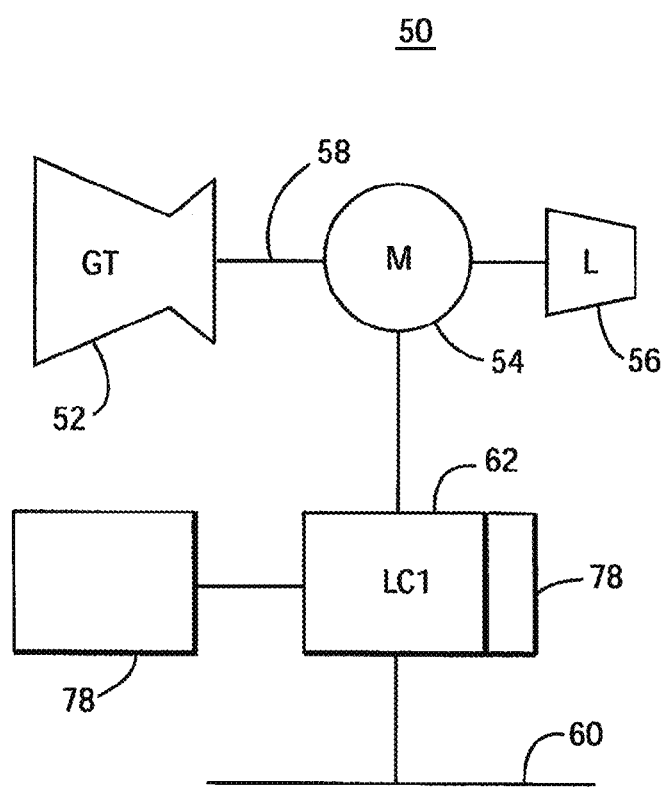
FIG. 3 is a schematic diagram of a gas turbine, motor and load controlled by a controller according to an exemplary embodiment.

According to an exemplary embodiment shown in FIG. 3, a system 50 includes a gas turbine 52, a motor 54, and a load 56. Other configurations involving a gas turbine and/or plural compressors or other turbo-machines as load 56 are possible. Still, other configurations may include one or more expanders, one or more power generators, or other machines having a rotating part. e.g., wind turbines, gearboxes. The system shown in FIG. 3 is exemplary and is simplified for a better understanding of the novel features. However, one skilled in the art would appreciate that other systems having more or less components may be adapted to include the navel features now discussed.

The connection of various masses (associated with the rotors and impellers of the machines) to a shaft 58 makes the system 50 prone to potential torsional vibrations. These torsional vibrations may twist the shaft 58, which may result in significant lifetime reduction or even destruction of the shaft system (which may include not only the shaft or shafts but also couplings and gearbox depending on the specific situation). The exemplary embodiments provide a mechanism for reducing the torsional vibrations.

Figure 4:
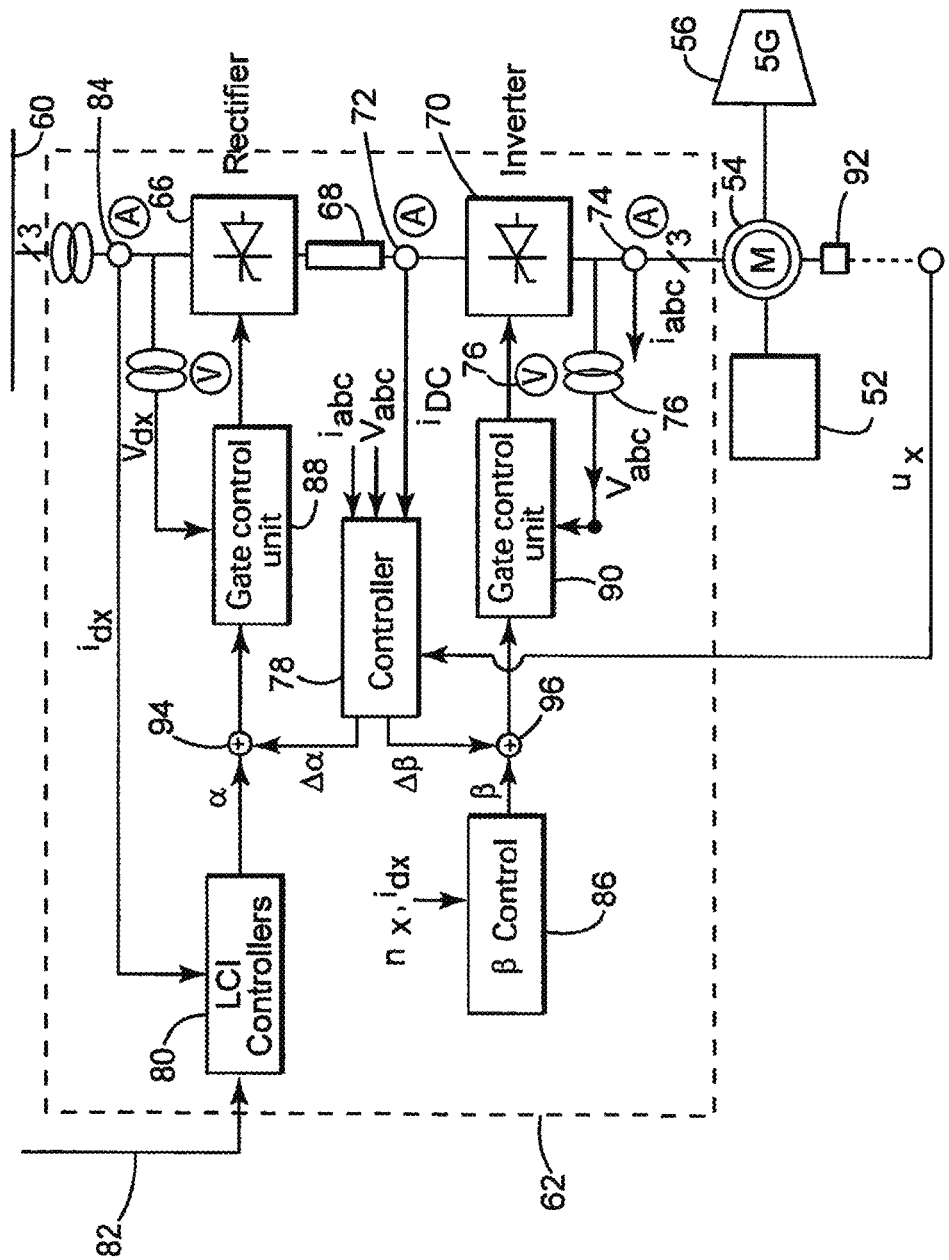
FIG. 4 is a schematic diagram of a converter and associated logic according to an exemplary embodiment.

To activate the motor 54, electrical power is supplied from the power grid or a local generator 60 in case of island or island like power systems. In order to drive the motor 54 at a variable speed, a load commutated inverter (LCI) 62 is provided between the grid 60 and the motor 54. As shown in FIG. 4, the LCI 62 includes a rectifier 66 connected to a DC link 68 which is connected to an inverter 70. The rectifier 66, DC link 68, and inverter 70 are known in the art and their specific structures are not discussed here further. As noted above, the novel features may be applied, with appropriate changes, to VSI systems. For illustration only, an exemplary VSI is shown and briefly discussed with regard to FIG. 16. FIG. 4 indicates that the current and voltage received from the grid 60 are three phase currents and voltages, respectively. The same is true for the currents and voltages through the rectifier, inverter and the motor and this fact is indicated in FIG. 4 by symbol "/3", However, the novel features of the exemplary embodiments are applicable to systems configured to work with more than three phases, e.g., 6 phase and 12 phase systems.

LCI 62 also includes current and voltage sensors, denoted by a circled A and a circled V in FIG. 4. For example, a current sensor 72 is provided in the DC link 68 to measure a current $i_{DC}$. Alternatively, the current in the DC link is calculated based on measurements performed in the AC side, for example current sensors 84 or 74 as these sensors are less expensive than DC sensors. Another example is a current sensor 74 that measures a current $i_{abc}$ provided by the inverter 70 to the motor 54 and a voltage sensor 76 that measures a voltage $v_{abc}$ provided by the inverter 70 to the motor 54. It is noted that these currents and voltages may be provided as input to a controller 78. The term "controller" is used herein to encompass any appropriate digital, analog, or combination thereof circuitry or processing units for accomplishing the designated control function. Returning to FIG. 3, it is noted that controller 78 may be part of the LCI 62 or may be a standalone controller exchanging signals with the LCI 62. The controller 78 may be a torsional mode damping controller.

FIG. 4 also shows that an LCI controller 80 may receive mechanical measurements regarding one or more of the gas turbine 52, the motor 54 and the load 56 shown in FIG. 3. The same may be true for controller 78. In other words, controller 78 may be configured to receive measurement data from any of the components of the system 50 shown in FIG. 3. For example, FIG. 4 shows a measurement data source 79. This data source may provide mechanical measurements and/or electrical measurements from any of the components of the system 50. A particular example that is used for a better understanding and not to limit the exemplary embodiments is when data source 79 is associated with the gas turbine 52. A torsional position, speed, acceleration or torque of the gas turbine 52 may be measured by existing sensors. This data may be provided to controller 78 as shown in FIG. 4. Another example is electrical measurements taken at the converter 62 or motor 54. Data source 79 may provide these measurements to controller 78 or controller 80 if necessary.

Controller 80 may generate, based on various references 82, and a current $i_{dx}$ received from a sensor 84, a rectifier delay angle α for controlling the rectifier 66. Regarding the rectifier delay angle α, it is noted that LCIs are designed to transfer active power from the grid 60 to the motor 54 or vice versa. Achieving this transfer with an optimal power factor involves the rectifier delay angle α and the inverter delay angle β. The rectifier delay angle α may be modulated by applying, for example, a sine wave modulation. This modulation may be applied for a limited amount of time. In one application, the modulation is applied continuously but the amplitude of the modulation varies. For example, as there is no torsional vibration in the shaft, the amplitude of the modulation may be zero, i.e., no modulation. In another example, the amplitude of the modulation may be proportional with the detected torsional vibration of the shaft.

Another controller 86 may be used for generating an inverter delay angle β for the inverter 70. Modulating the inverter delay angle β results in modulating the inverter DC voltage which causes a modulation of the DC link current and results in an active power oscillation on the load input power. In other words, modulating only the inverter delay angle in order to achieve torsional mode damping results in the damping power coming mainly from the magnetic energy stored in the DC link 68. Modulation of the inverter delay angle results in rotational energy being transformed into magnetic energy and vice versa, depending whether the rotating shaft is accelerated or decelerated.

Further, FIG. 4 shows a gate control unit 88 for the rectifier 66 and a gate control unit 90 for the inverter 70 that directly control the rectifier and inverter based on information received from controllers 80 and 86. An optional sensor 92 may be located in close proximity to the shaft of the motor 54 for detecting the dynamic torque components, e.g., a torque present in the shaft or a torsional speed of the shaft or a torsional acceleration of the shaft or a torsional position of the shaft. Other similar sensors 92 may be placed between motor 54 and gas turbine 52 or at gas turbine 52. Information $u_x$ regarding measured dynamic torque components (by sensors 92) may be provided to controllers 78, 80 and 86. FIG. 4 also shows summation blocks 94 and 96 that add a signal from controller 78 to signals generated by controllers 80 and 86.

Figure 5:
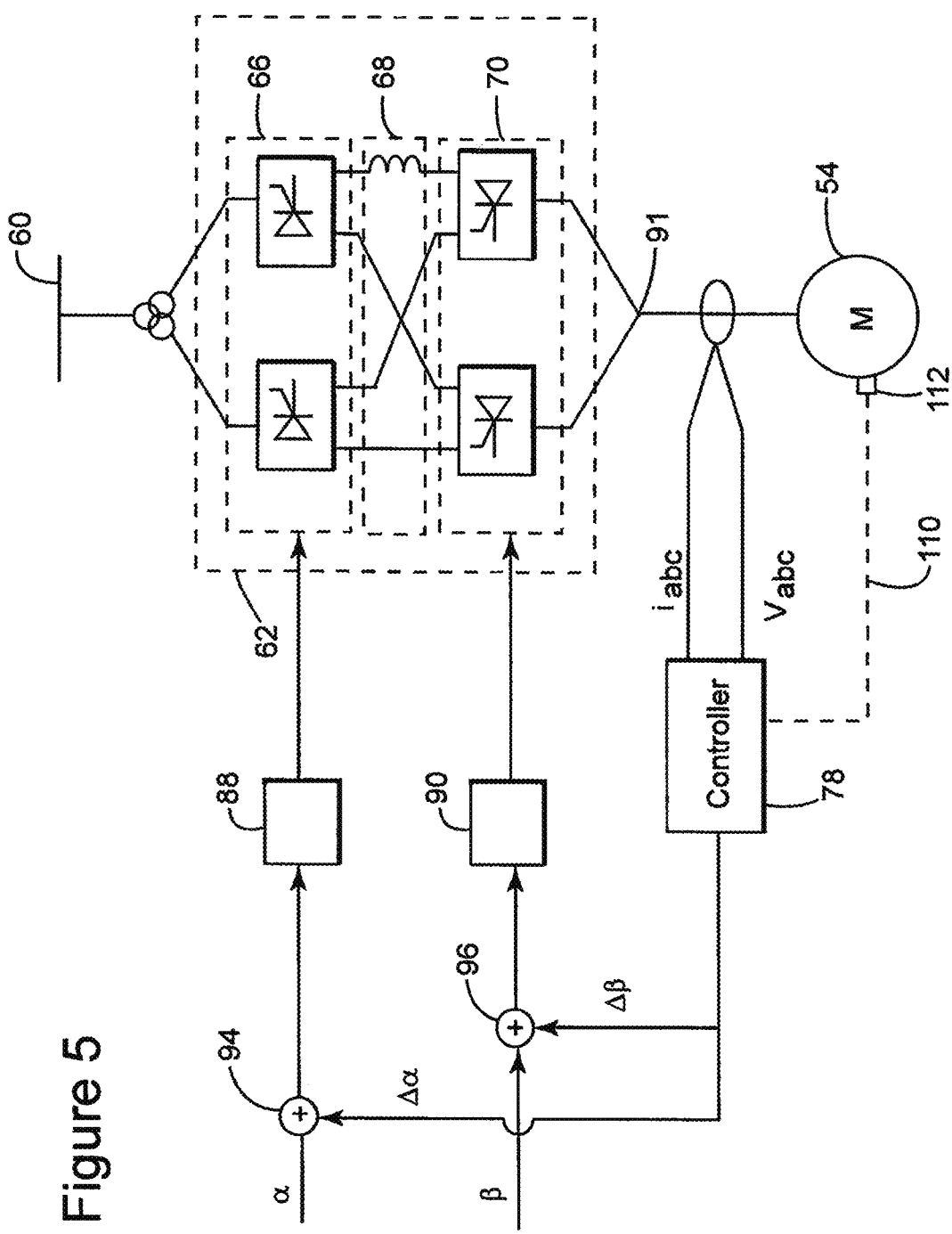
FIG. 5 is a schematic diagram of a converter and associated logic according to an exemplary embodiment.

According to an exemplary embodiment illustrated in FIG. 5, the torsional mode damping controller 78 may receive a current $i_{abc}$ and a voltage $v_{abc}$ measured at an output 91 of the LCI 62 or the inverter 70. Based on these values (no information about a measured torque or speed or acceleration of the shaft of the motor), an air gap torque for the motor is calculated and fed into a mechanical model of the system. The mechanical model of the system may be represented by several differential equations representing the dynamic behavior of the mechanical system and linking the electrical parameters to the mechanical parameters of the system. The model representation includes, for example, estimated inertia, damping and stiffness values (which can be verified by field measurements) and allows to calculate the dynamic behavior of the shaft, e.g., torsional oscillations. The needed accuracy for torsional mode damping may be achieved as mainly the accuracy of the phase of the dynamic torque component is relevant for the torsional mode damping, and the amplitude information or absolute torque value is less important.

In this regard, it is noted that the air gap torque of an electrical machine is the link between the electrical and mechanical system of a drive train. All harmonics and inter-harmonics in the electrical system are also visible in the air-gap torque. Inter-harmonics at a natural frequency of the mechanical system can excite torsional oscillations and potentially result into dynamic torque values in the mechanical system above the rating of the shaft. Existing torsional mode damping systems may counteract such torsional oscillations but these systems need a signal representative of the dynamic torque of the motor and this signal is obtained from a sensor that effectively monitors the shaft of the motor or shaft components of the motor, such as toothwheels mounted along the shaft of the motor. According to exemplary embodiments, no such signal is needed as the dynamic torque components are evaluated based on electrical measurements. However, as will be discussed later, some exemplary embodiments describe a situation in which available mechanical measurements at other components of the system, for example, the gas turbine, may be used to determine the dynamic torque components along the mechanical shaft.

In other words, an advantage according to an exemplary embodiment is applying torsional mode damping without the need of torsional vibration sensing in the mechanical system. Thus, torsional mode damping can be applied without having to install additional sensing in the electrical or mechanical system as current voltage and/or current and/or speed sensors can be made available at comparably low cost. In this regard, it is noted that mechanical sensors for measuring torque are expensive for high power applications, and sometimes these sensors cannot be added to the existing systems. Thus, the existent torsional mode damping solutions cannot be implemented for such cases as the existent torsional mode damping systems require a sensor for measuring a signal representative of a mechanical parameter of the system that is indicative of torque. On the contrary, the approach of the exemplary embodiment of FIG. 5 is reliable, cost effective and allows retrofitting an existing system.

Figure 6:
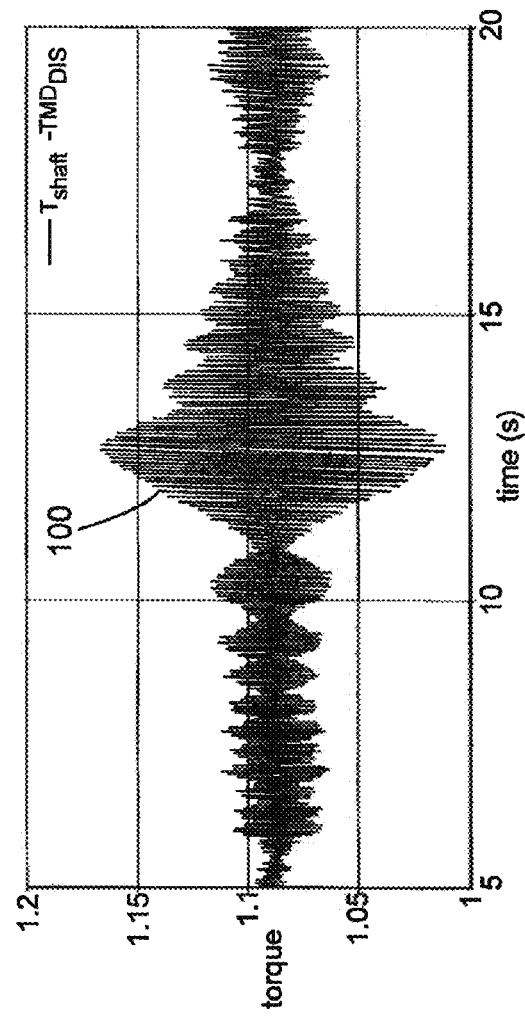
FIG. 6 is a graph illustrating a torque of a shaft with disabled damping control.
Figure 7:
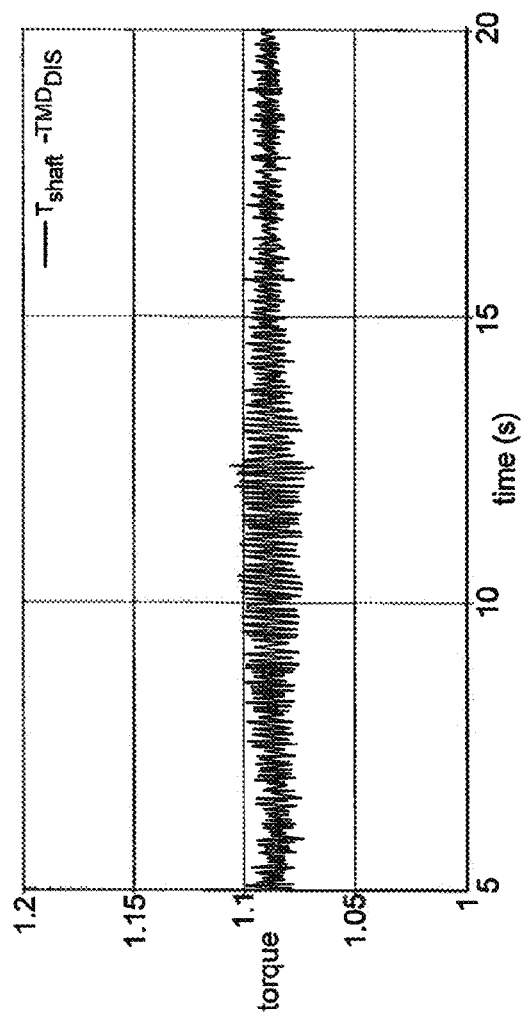
FIG. 7 is a graph illustrating a torque of a shaft with enabled damping control according to an exemplary embodiment.

Upon receiving the current and voltage indicated in FIG. 5, controller 78 may generate appropriate signals (modulations for one or more of $\Delta\alpha$ and $\Delta\beta$) for controlling the rectifier delay angle $\alpha$ and/or the inverter delay angle $\beta$. Thus, according to the embodiment shown in FIG. 5, the controller 78 receives measured electrical information from an output 91 of the inverter 70 and determines/calculates the various delay angles, based, for example, on the damping principle described in U.S. Pat. No. 7,173,399. In one application, the delay angles may be limited to a narrow and defined range, for example, 2 to 3 degrees, not to affect the operation of the inverter and/or converter. In one application, the delay angles may be limited to only one direction (either negative or positive) to prevent commutation failure by overhead-firing of the thyristors, As illustrated in FIG. 5, this exemplary embodiment is an open loop as corrections of the various angles are not adjusted/verified based on a measured signal (feedback) of the mechanical drive train connected to motor 54. Further, simulations performed show a reduction of the torsional vibrations when the controller 78 is enabled. FIG. 6 shows oscillations 100 of the torque of the shaft of the motor 54 versus time when the controller 78 is disabled and FIG. 7 shows how the same oscillations are reduced/damped when the controller 78 is enabled to generate alpha modulation, for example, at time 12 s, while the mechanical drive train is operated in variable speed operation and crossing at t=12 s a critical speed. Both figures plot a simulated torque on the y axis versus time on the x axis.

Figure 8:
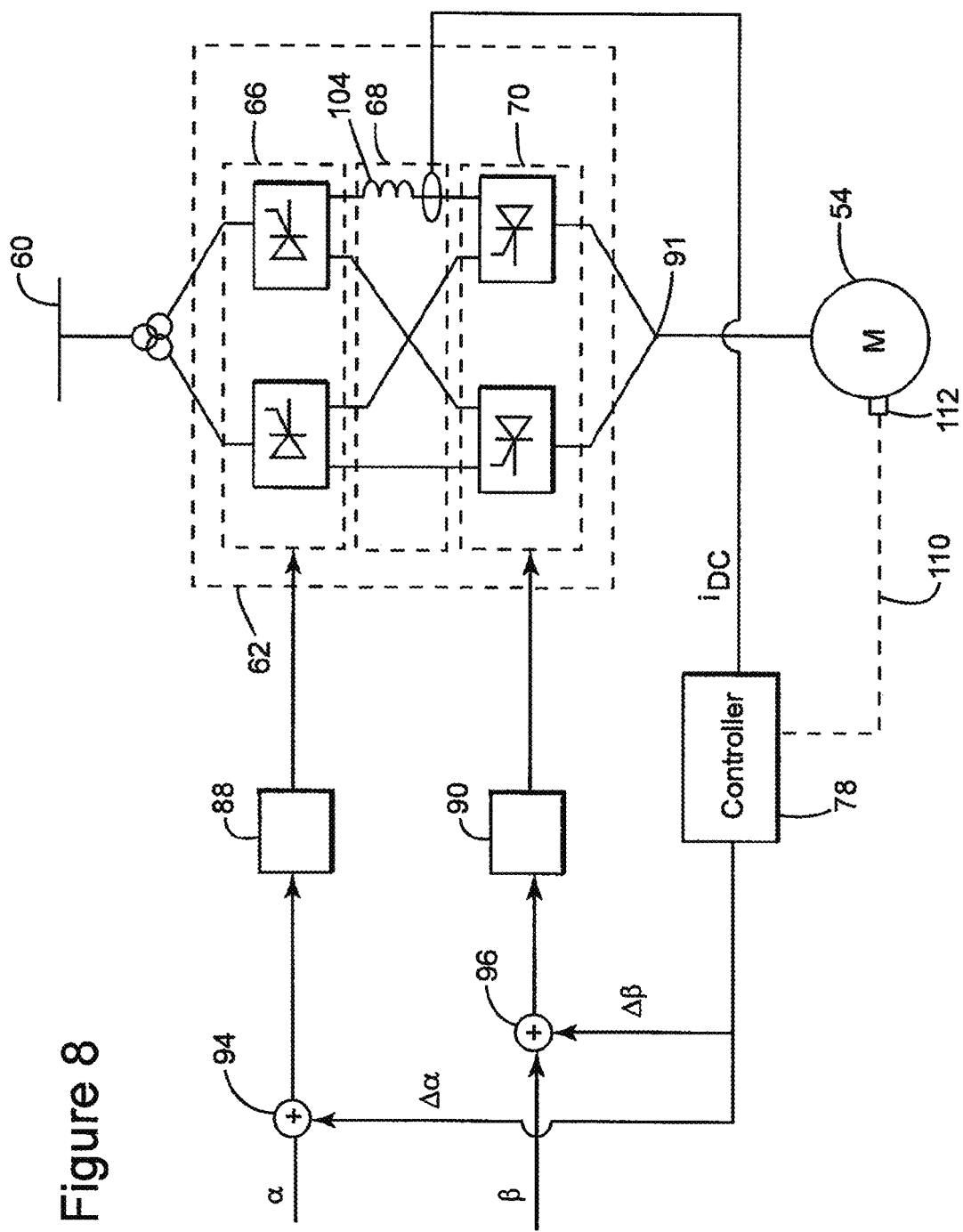
FIG. 8 is a schematic diagram of a converter and associated logic according to an exemplary embodiment.

According to another exemplary embodiment illustrated in FIG. 8, the controller 78 may be configured to calculate one or more of the delay angles changes (modulations) $\Delta\alpha$ and/or $\Delta\beta$ based on electrical quantities obtained from the DC link 68. More specifically, a current $i_{DC}$ may be measured at an inductor 104 of the DC link 68 and this value may be provided to controller 78. In one application. only a single current measurement is used for feeding controller 78. Based on the value of the measured current and the mechanical model of the system, the controller 78 may generate the above noted delay angle changes. According to another exemplary embodiment, the direct current $I_{DC}$ may be estimated based on current and/or voltage measurements performed at the rectifier 66 or inverter 70.

The delay angle changes calculated by the controller 78 in any of the embodiments discussed with regard to FIGS. 5 and 8 may be modified based on a closed loop configuration. The closed loop configuration is illustrated by dashed line 110 in FIG. 8. The closed loop indicates that an angular position, speed, acceleration, or torque of the shaft of the motor 54 may be determined with an appropriate sensor 112 and this value may be provided to the controller 78. The same is true if sensor or sensors 112 are provided to the gas turbine or other locations along shaft 58 shown in FIG. 3.

Figure 9:
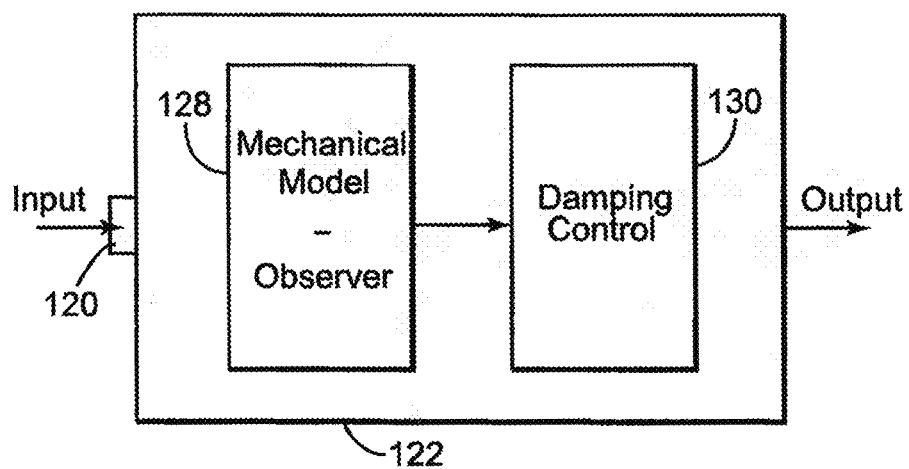
FIG. 9 is a schematic diagram of a controller configured to control a converter for damping torsional vibrations according to an exemplary embodiment.

The structure of the controller 78 is discussed now with regard to FIG. 9. According to an exemplary embodiment, the controller 78 may include an input interface 120 (or multiple input interfaces configured to receive signals from various components of the system) that is connected to one of a processor, analog circuitry, reconfigurable FPGA card, etc. 122, Element 122 is configured to receive the electrical parameters from the LCI 62 and calculate the delay angle changes. Element 122 may be configured to store a mechanical model 128 (disclosed in more details with regard to FIG. 17) and to input the electrical and/or mechanical measurements received at input interface 120 into the mechanical model 128 to calculate one or more of the dynamical torque components of the motor 54. Based on the one or more dynamical torque components, damping control signals are generated in damping control unit 130 and the output signal is then forwarded to a summation block and a gate control unit. According to another exemplary embodiment, the controller 78 may be an analog circuit, a reconfigurable FPGA card or other dedicated circuitry for determining the delay angle changes.

In an exemplary embodiment, controller 78 continuously receives electrical measurements from various current and voltage sensors and continuously calculates torsional damping signals based on dynamic torque components calculated based on the electrical measurements. According to this exemplary embodiment, the controller does not determine whether torsional vibrations are present in the shaft but rather continuously calculates the torsional damping signals based on the calculated dynamic torque value. However, if there are no torsional vibrations, the torsional damping signals generated by the controller and sent to the inverter and/or rectifier are not affecting the inverter and/or rectifier, i.e., the angle changes provided by the damping signals are negligible or zero. Thus, according to this exemplary embodiment, the signals affect the inverter and/or rectifier only when there are torsional vibrations.

According to an exemplary embodiment, the direct torque or speed measurement at the gas turbine shaft (or estimated speed or torque information in the shaft) enables the controller to modulate an energy transfer in the LCI in counter-phase to the torsional velocity of a torsional oscillation. Damping power exchanged between the generator and the LCI drive may be electronically adjusted and may have a frequency corresponding to a natural frequency of the shaft system. This damping method is effective for mechanical systems with a high Q factor, i.e., rotor shaft system made of steel with high torsional stiffness. In addition, this method of applying an oscillating electrical torque to the shaft of the motor and having a frequency corresponding to a resonant frequency of the mechanical system uses little damping power.

Therefore, the above discussed controller may be integrated into a drive system based on the LCI technology without overloading the drive system. This facilitates the implementation of the novel controller to new or existing power systems and makes it economically attractive. The controller may be implemented without having to change the existing power system, e.g., extending the control system of one of the LCI drives in the island network.

If the LCI operational speed and torque is varied in a large range, the effectiveness of the torsional mode damping may depend on the grid-side converter current control performance. The torsional mode damping operation results in a small additional DC link current ripple at a torsional natural frequency. As a result, there are two power components at this frequency: the intended component due to inverter firing angle control and an additional component due to the additional current ripple. The phase and magnitude of this additional power component is function of system parameters, current control settings and point of operation. These components result into a power component that is dependent on current control and a component that is dependent on angle modulation.

According to an exemplary embodiment, two alternative ways of power modulation may be implemented by the controller. A first way is to directly use the current reference on the grid side (requires fast current control implementation), e.g., α-modulation with a damping component. A second way is to modulate the grid-side and the machine-side angles, resulting into a constant dc-link current, e.g., α-β-modulation with a damping frequency component. The current control on the grid-side is part of this damping control and therefore, the current control does not counteract the effect of the angle modulation. In this way, the damping effect is higher and independent from the current control settings.

Figure 1:
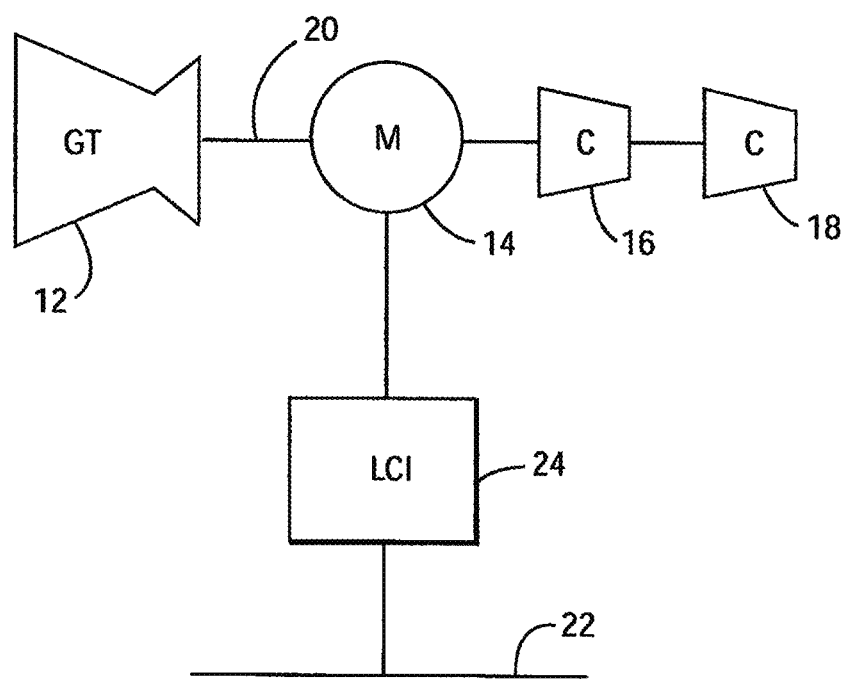
FIG. 1 is a schematic diagram of a conventional gas turbine connected to an electrical machine and two compressors.
Figure 2:
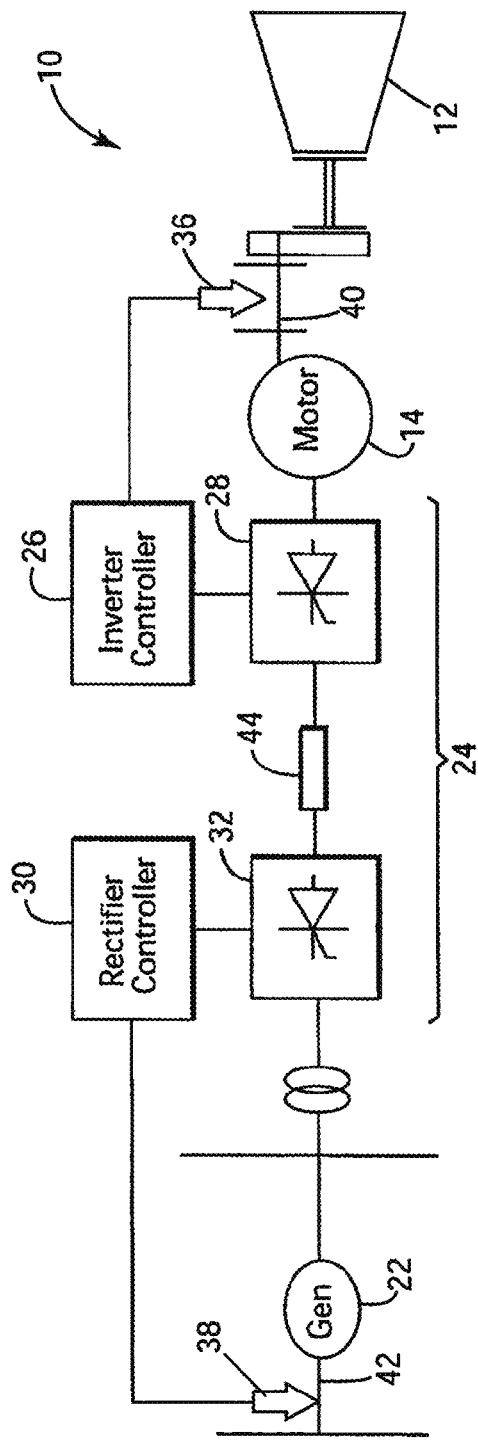
FIG. 2 is a schematic diagram of a driving train including rectifier controller and inverter controller.
Figure 10:
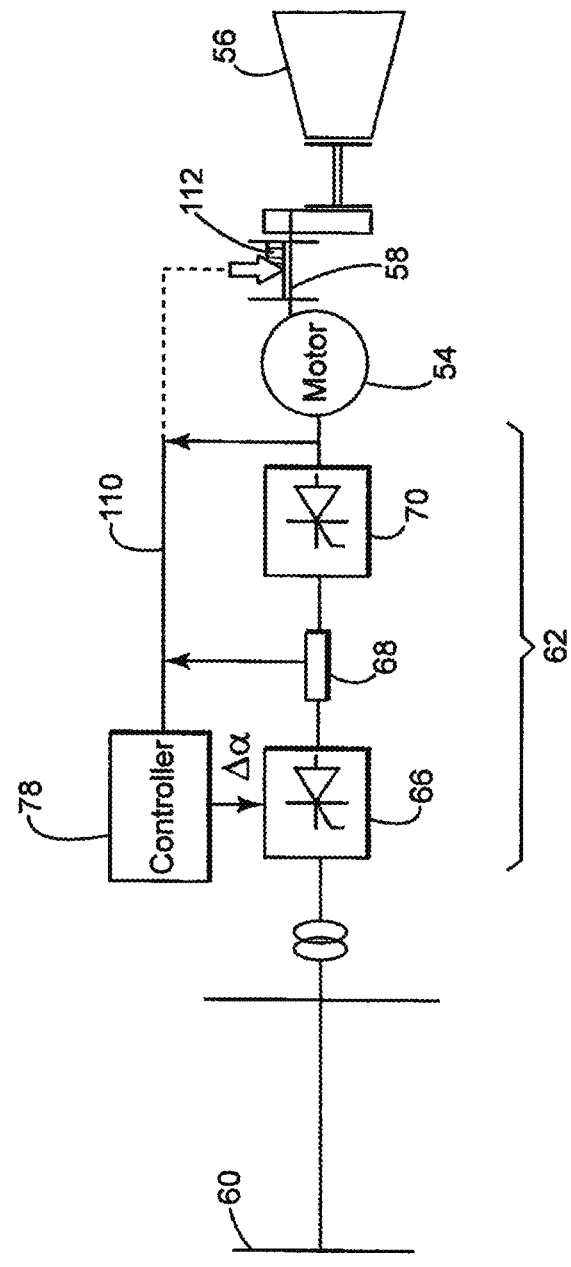
FIG. 10 is a schematic diagram of a controller that provides modulation to a rectifier according to an exemplary embodiment.

According to an exemplary embodiment illustrated in FIG. 10, the system 50 includes similar elements to the system shown in FIGS. 3 and 4. Controller 78 is configured to receive electrical measurements (as shown in FIGS. 4, 5, and 8) and/or mechanical measurements (see for example FIGS. 4 and 8 or sensor 112 and link 110 in FIG. 10) with regard to one or more of the motor 54 or load 56 or the gas turbine (not shown) of system 50. Based only on the electrical measurements, or only on the mechanical measurements, or on a combination of the two, the controller 78 generates control signals for applying α-modulation to the rectifier 66. For example, current reference modulation is achieved by α-modulation while the β angle is maintained constant at the inverter 70. The α-modulation is represented, for example, by Δα in both FIGS. 4 and 10. It is noted that this α-modulation is different from the one disclosed in U.S. Pat. No. 7,173,399 for at least two reasons. A first difference is that the mechanical measurements (if used) are obtained in the present exemplary embodiment from a location along shaft 58 (i.e., motor 54, load 56 and/or gas turbine 52) while U.S. Pat. No. 7,173,399 uses a measurement of a power generator 22 (see FIG. 2). A second difference is that according to an exemplary embodiment, no mechanical measurements are received and used by the controller 78 for performing the α-modulation.

Figure 11:
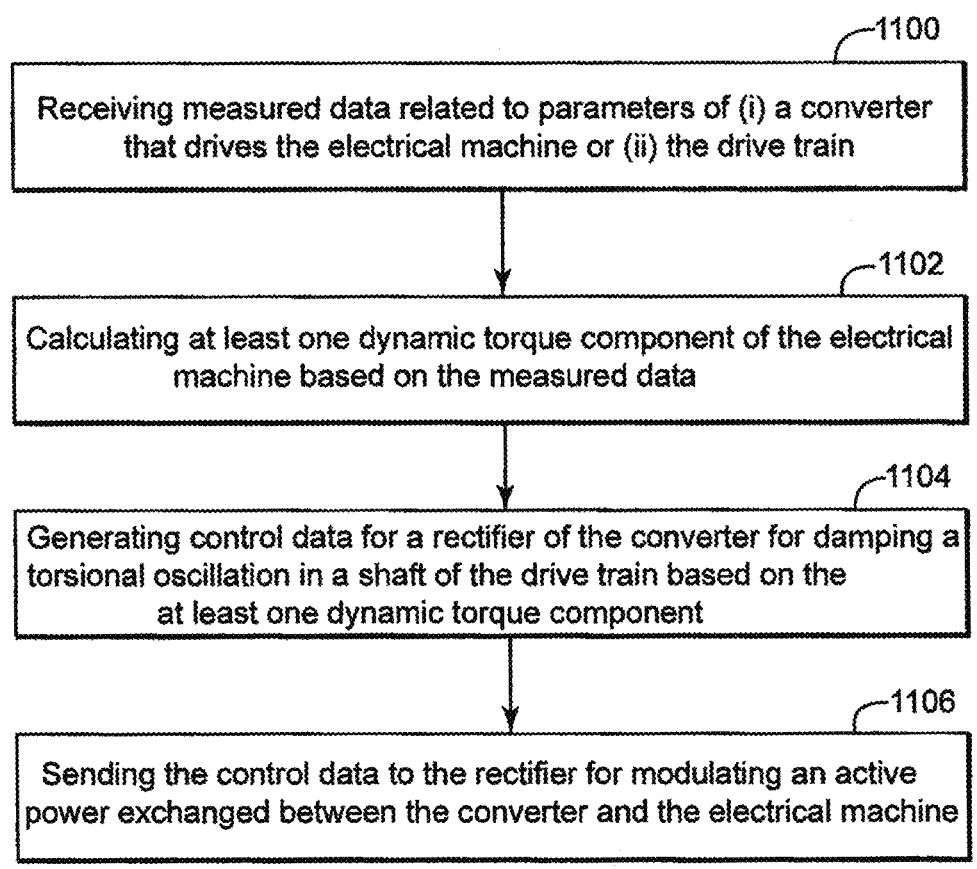
FIG. 11 is a flow chart of a method that controls a rectifier for damping torsional vibrations according to an exemplary embodiment.

According to an exemplary embodiment illustrated in FIG. 11, there is a method for damping a torsional vibration in a compression train including an electrical machine. The method includes a step 1100 of receiving measured data related to parameters of (i) a converter that drives the electrical machine or (ii) the compression train, a step 1102 of calculating at least one dynamic torque component of the electrical machine based on the measured data, a step 1104 of generating control data for a rectifier of the converter for damping a torsional oscillation in a shaft of the compression train based on the at least one dynamic torque component, and a step 1106 of sending the control data to the rectifier for modulating an active power exchanged between the converter and the electrical machine.

Figure 12:
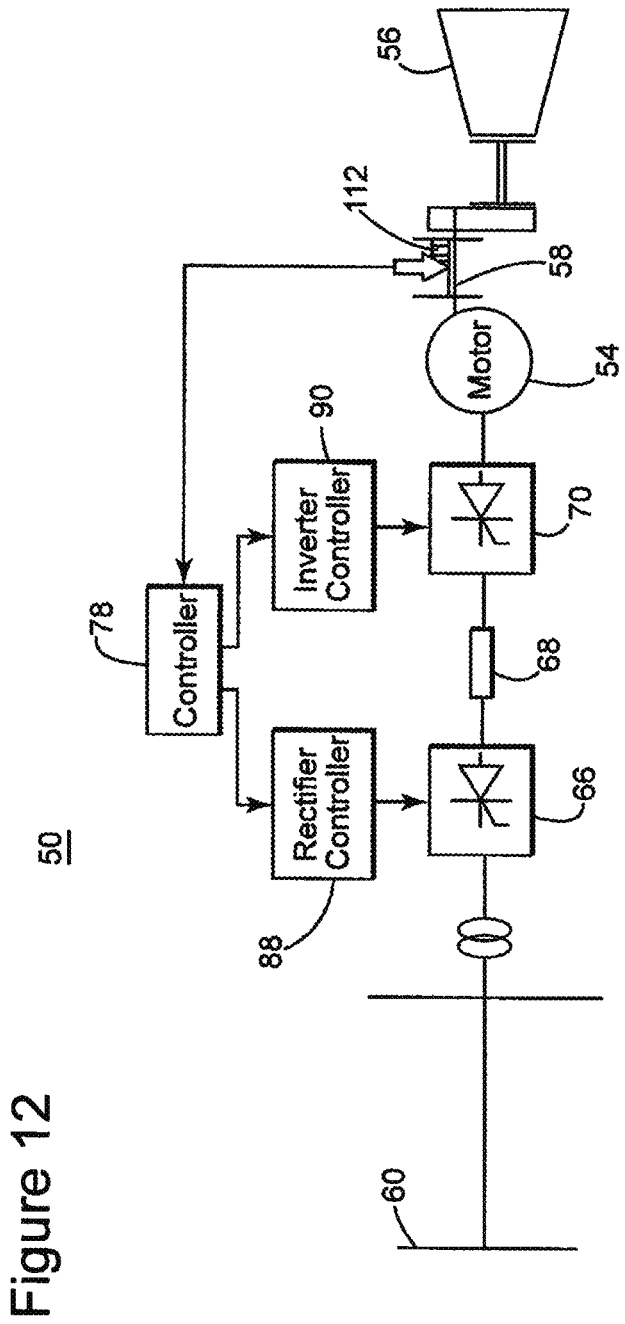
FIG. 12 is a schematic diagram of a controller that provides modulation to a rectifier and an inverter according to an exemplary embodiment.

According to another exemplary embodiment illustrated in FIG. 12, system 50 may have both the rectifier 66 and the inverter 70 simultaneously controlled (i.e., both α-modulation and β-modulation) for damping torsional oscillations. As shown in FIG. 12, controller 78 provides modulations for both the rectifier controller 88 and the inverter controller 90. Controller 78 determines the appropriate modulation based on (i) mechanical measurements measured by sensor(s) 112 at one of the motor 54, load 56 and/or gas turbine 52, (ii) electrical measurements as shown in FIGS. 4, 5, and 8, or a combination of (i) and (ii).

Figure 13:
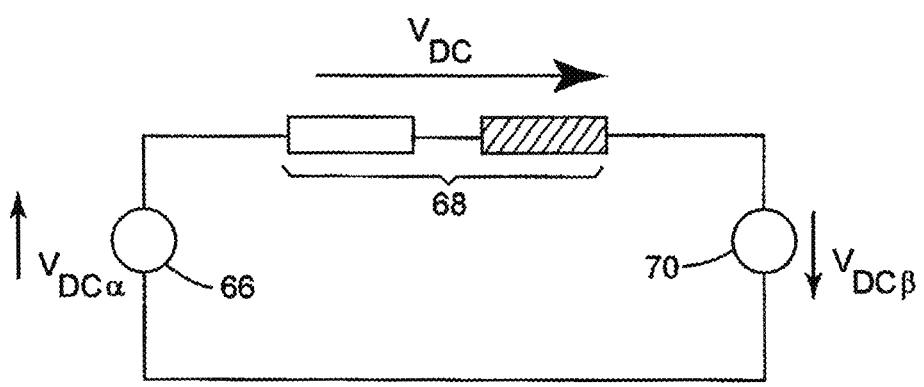
FIG. 13 is a schematic diagram of voltages existent at an inverter, rectifier and DC link of a converter according to an exemplary embodiment.

More specifically, the α- and β-modulation may be correlated as discussed next with reference to FIG. 13. FIG. 13 shows representative voltage drops across rectifier 66, DC link 68 and inverter 70. As a result of the α- and β-modulation it is desired that the DC link current is constant. Associated voltage drops shown in FIG. 13 are given by:

$$V_{DC\alpha} = k \cdot V_{ACG} \cdot \cos(\alpha)$$

$$v_{DC\beta} = k \cdot V_{ACM} \cdot \cos(\beta), \text{ and}$$

$$V_{DC\alpha} = V_{DC\beta} + V_{DCL},$$

where $V_{ACG}$ is the voltage amplitude of the power grid 60 in FIG. 12 and $V_{ACM}$ is the voltage amplitude of the motor 54.

By differentiating the last relation with time and imposing the condition that the change of the $V_{DCL}$ in time is zero. the following mathematical relation is obtained between the α-modulation and the β-modulation:

$$d(V_{DC\alpha})/dt = -k \cdot V_{ACG} \cdot \sin(\alpha) \text{ and } d(V_{DC\beta})/dt = -k \cdot V_{ACM} \cdot \sin(\beta),$$

which results in $$d\alpha = (V_{ACM} \sin(\beta))/(V_{ACG} \sin(\alpha)) \cdot d\beta.$$

Figure 14:
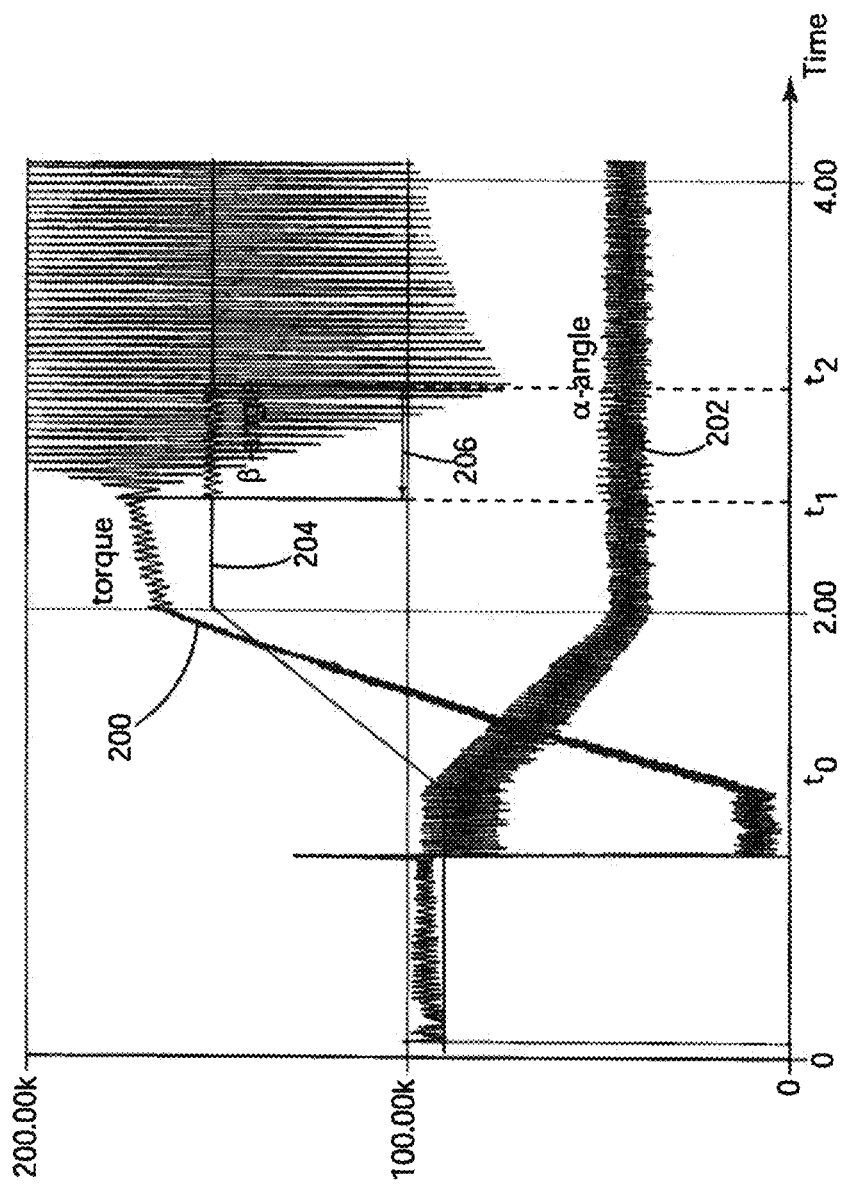
FIG. 14 is a graph indicating the torsional effect of alpha and beta angle modulations according to an exemplary embodiment.

Based on this last relation, both the α-modulation and β-modulation are performed simultaneously, as shown, for example, in FIG. 14. FIG. 14 shows the actual torque 200 increasing around $t_0 = 1.5$ seconds. It is noted that no α-modulation 202 or β-modulation 204 is applied between $t_0$ and $t_1$. At $t_1$ an excitation 206 is applied between $t_1$ and $t_2$ and both modulations 202 and 204 are applied. At the end of the time interval $t_1$ to $t_2$ it is noted that both modulations are removed and the oscillations of the torque 200 is exponentially decreasing because of the inherent mechanical damping properties of the mechanical drive train. This example is simulated and not measured in a real system. For this reason, both modulations are strictly controlled, e.g., are started at $t_1$ and stopped at $t_2$. However, in a real implementation of the α-modulation and β-modulation, the modulations may be performed continuously with the amplitude of the modulation being adjusted based on the severity of the torsional oscillations. An advantage of this combined modulation over the β-modulation is that there is no need for phase adaption at different operating points and the LCI control parameters may have no effect on the damping performance. This modulation example is provided to illustrate the effect of modulating both delay angles on the mechanical system. The simulation result is shown using an open loop response to the mechanical system for the torsional damping system with inverse damping performance.

Figure 15:
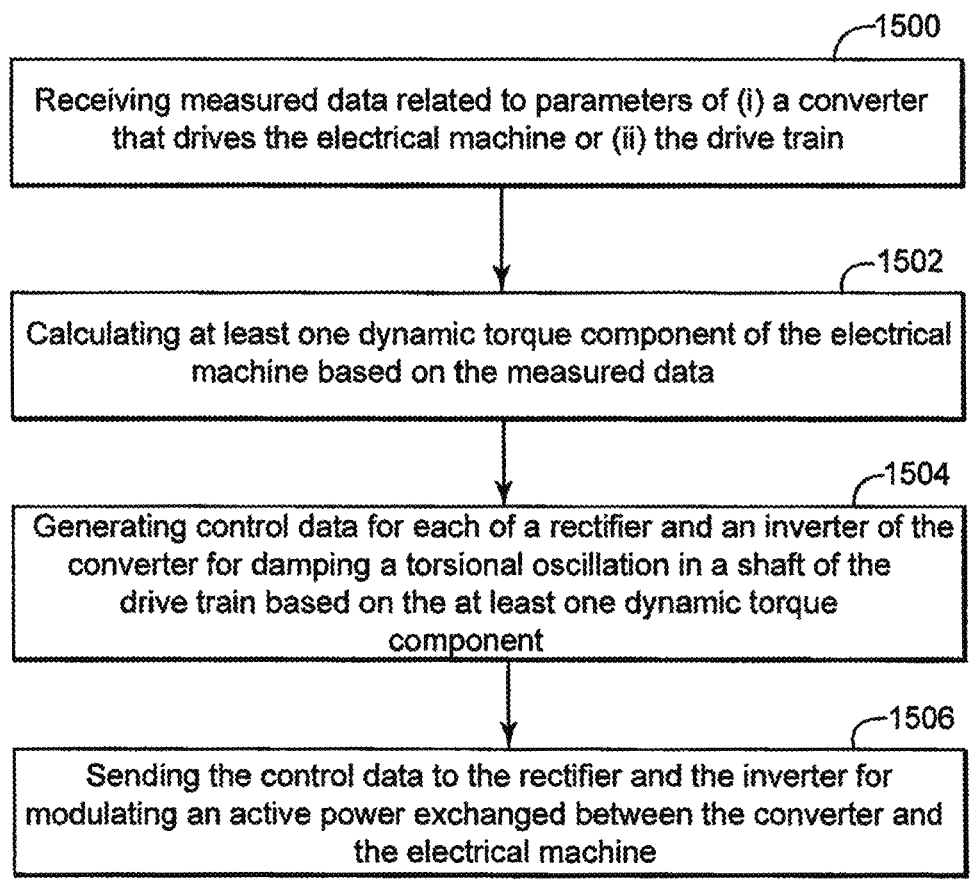
FIG. 15 is a flow chart of a method that controls an inverter and a rectifier for damping torsional vibrations according to an exemplary embodiment.

According to an exemplary embodiment illustrated in FIG. 15, there is a method for damping a torsional vibration in a drive train including an electrical machine. The method includes a step 1500 of receiving measured data related to parameters of (i) a converter that drives the electrical machine or (ii) the drive train, a step 1502 of calculating at least one dynamic torque component of the electrical machine based on the measured data, a step 1504 of generating control data for each of an inverter and a rectifier of the converter for damping a torsional oscillation in a shaft of the drive train based on the at least one dynamic torque component, and a step 1506 of sending the control data to the inverter and the rectifier for modulating an active power exchanged between the converter and the electrical machine. It is noted that the dynamic torque component includes a rotational position, rotational speed, rotational acceleration or a torque related to a section of the mechanical shaft, it is also noted that the expression modulating an active power expresses the idea of modulation at an instant even if the mean active power over a period T is zero. In addition, if a VSI is used instead of an LCI another electrical quantity may be modified as appropriate instead of the active power.

Figure 16:
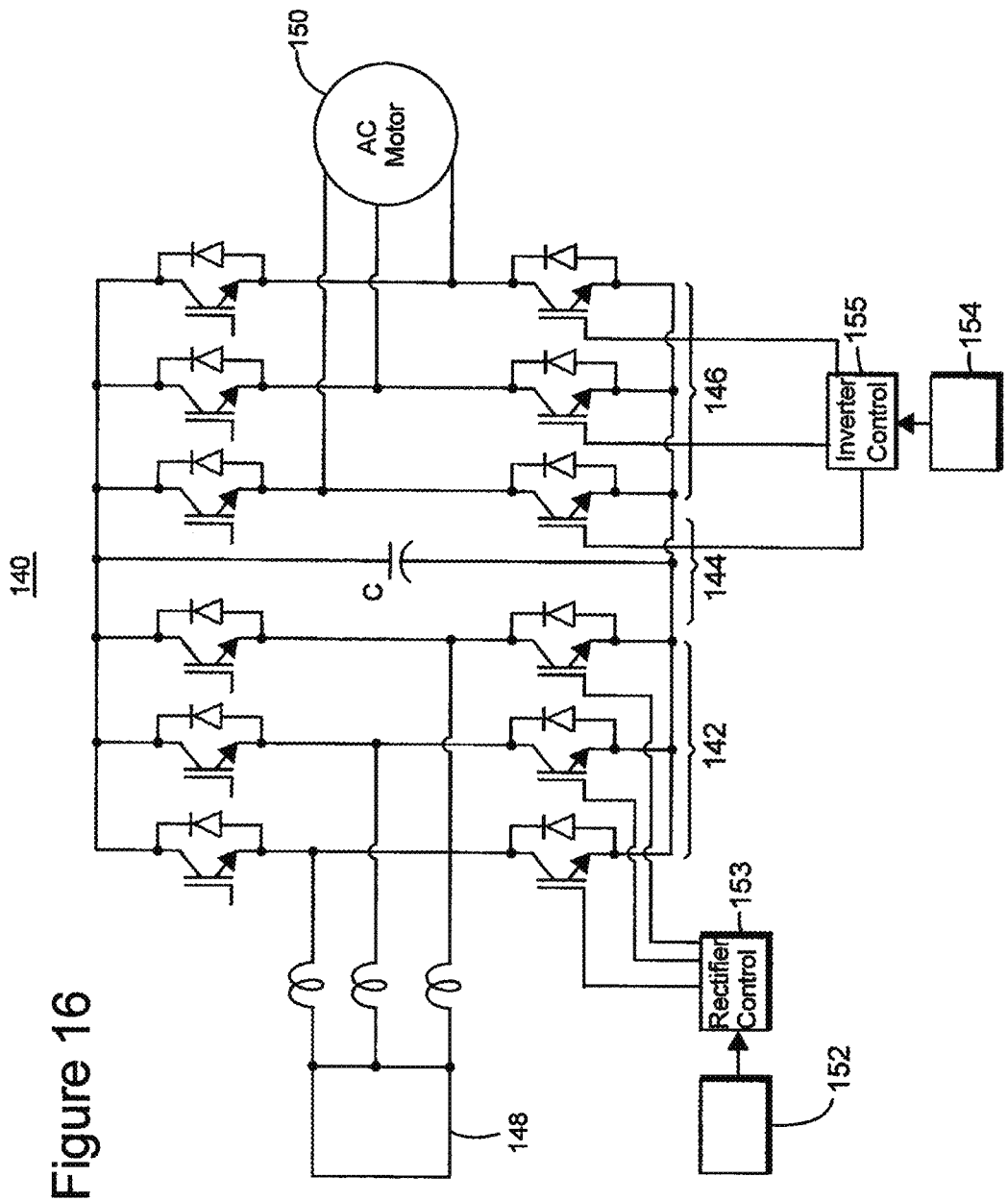
FIG. 16 is a schematic diagram of a voltage source inverter and associated controller for damping torsional vibrations according to an exemplary embodiment.

According to an exemplary embodiment illustrated in FIG. 16, a VSI 140 includes a rectifier 142, a DC link 144, and an inverter 146 connected to each other in this order. The rectifier 142 receives a grid voltage from a power source 148 and may include, for example, a diode bridge or an active front-end based on semiconductor devices. The dc voltage provided by the rectifier 142 is filtered and smoothed by capacitor C in the DC link 144. The filtered dc voltage is then applied to the inverter 146, which may include self-commutated semiconductor devices, e.g., Insulated Gate Bipolar Transistors (IGBT), that generate an ac voltage to be applied to motor 150. Controllers 152 and 154 may be provided for rectifier 142 and inverter 146, in addition to the rectifier and inverter controllers or integrated with the rectifier and inverter controllers, to damp torsional vibrations on the shaft of the motor 150. The rectifier controller 153 and inverter controller 155 are shown connected to some of the semiconductor devices but it should be understood that all the semiconductor devices may be connected to the controllers. Controllers 152 and 154 may be provided together or alone and they are configured to determine dynamic torque components based on electrical measurements as discussed with regard to FIGS. 4 and 5 and influence control references of the build-in rectifier and inverter control, e.g., the torque or current-control reference.

Figure 17:
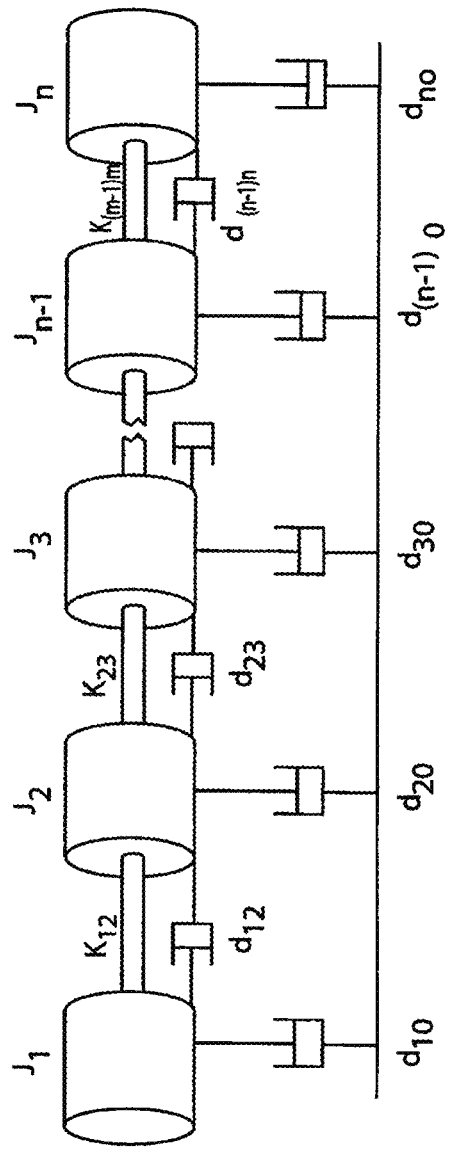
FIG. 17 is a schematic diagram of a multimass system.

According to an exemplary embodiment illustrated in FIG. 17, a generalized multimass system 160 may include "n" different masses having corresponding moments of inertia $J_1$ to $J_n$. For example, the first mass may correspond to a gas turbine, the second mass may correspond to a compressor, and so on while the last mass may correspond to an electrical motor. Suppose that the shaft of the electrical motor is not accessible for mechanical measurements, e.g., rotational position, speed, acceleration or torque. Further, suppose that the shaft of the gas turbine is accessible and one of the above noted mechanical parameters may be directly measured at the gas turbine. In this regard, it is noted that generally a gas turbine has high accuracy sensors that measure various mechanical variables of the shaft for protecting the gas turbine from possible damages. On the contrary, a conventional motor does not have these sensors or even if some sensors are present, the accuracy of their measurements is poor.

The differential equation of the whole mechanical system is given by:

$$J(d\theta^2/dt^2) + D(d\theta/dt) + K\theta = T_{ext},$$

where J (torsional matrix), D (damping matrix), and K (torsional stiffness matrix) are matrices connecting the characteristics of the first mass (for example, $d_{10}$, $d_{12}$, $k_{12}$, $J_1$) to the characteristics of the other masses and $T_{ext}$ is an external (net) torque applied to the system, e.g., by a motor. Based on this model of the mechanical system, a torque or other dynamic torque component of the "n" mass may be determined if characteristics of, for example, the first mass are known. In other words, the high accuracy sensors provided in the gas turbine may be used to measure at least one of a torsional position, speed, acceleration or torque of the shaft of the gas turbine. Based on this measured value, a dynamic torque component of the motor ("n" mass) or another section of the drive train may be calculated by a processor or controller 78 of the system and thus, control data may be generated for the inverter or rectifier as already discussed above.

In other words, according to this exemplary embodiment, the controller 78 needs to receive mechanical related information from one turbo-machinery that is connected to the motor and based on this mechanical related information the controller is able to control the converter to generate a torque in the motor to damp the torsional vibration. The turbo-machinery may be not only a gas turbine but also a compressor, an expander or other known machines. In one application, no electrical measurements are necessary for performing the damping. However, the electrical measurements may be combined with mechanical measurements for achieving the damping. In one application, the machine that applies the damping (damping machine) is not accessible for mechanical measurements and the dynamic torque component of the damping machine is calculated by mechanical measurements performed on another machine that is mechanically connected to the damping machine.

Figure 18:
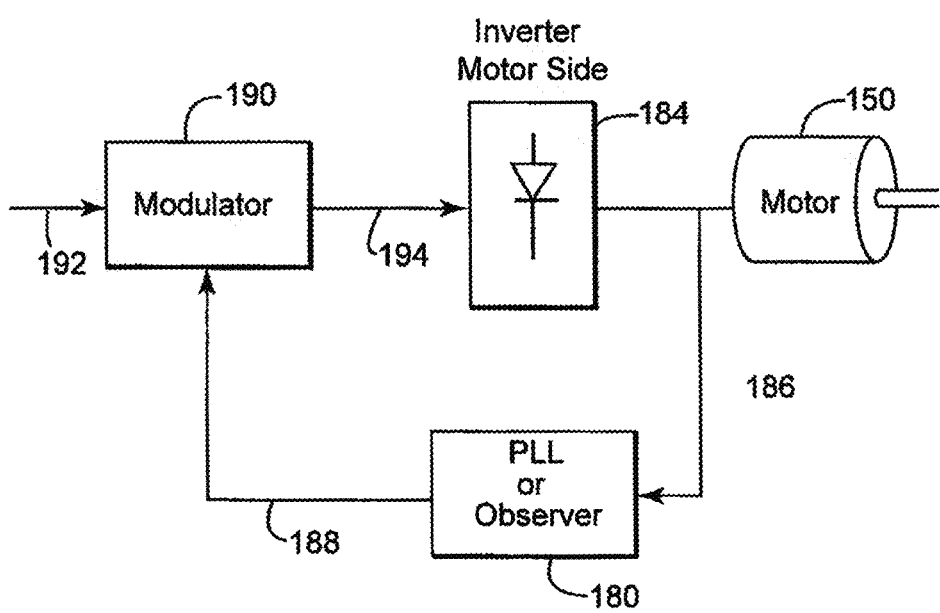
FIG. 18 is a schematic diagram of a control system for damping torsional vibrations based on one phase lock loop or dynamic observer according to an exemplary embodiment.

According to an exemplary embodiment illustrated in FIG. 18, only a motor 150 and the inverter on the LCI motor side 184 are shown. A position and speed of a shaft of the motor are variables that may be used to control the drive train. The position of the shaft of the motor (or motor voltage vector) may be used to accurately determine the β firing on the motor side.

The position of the shaft of the motor may be obtained from a position sensor attached to the shaft of the motor or obtained without a direct position sensor, e.g., through the use of an observer model fed by electrical variables of the motor and/or the drive itself. Similarly, the motor voltage vector may be evaluated from motor and/or drive electrical variables (e.g., motor voltages). The motor terminal voltage and/or current waveforms may include large noise and commutation spikes. For this reason, the motor terminal voltages and/or currents are not used directly to determine the motor voltage vector position or motor rotor position. In one application, a filtering operation is applied to the motor/drive electrical variables (for example, through the use of an observer model or by using a PLL (phase lock loop) device).

FIG. 18 shows an exemplary embodiment for explaining how firing pulses may be generated on the motor side given that no position sensor is directly attached to the motor. However, as noted above, it is possible to achieve the same result by using a position sensor. Starting from electrical variables 186 coming from the motor 182 and/or the drive train, the motor voltage vector(s) or the motor rotor position are derived by use of an observer or PLL block 180. This instantaneous angle 188 is fed to a modulator 190 in order to decide and send firing commands 194 to the inverter, depending also on a β command 192. Other methods may be used to lock to motor voltage vector position or motor rotor position as would be appreciated by those skilled in the art. Considering the exemplary embodiment illustrated in FIG. 18, dynamic characteristics of the PLL or observer 180 have to be accurate enough to accurately track the motor voltage vector position or motor rotor position and to avoid a reduction of a safety angle in case of a high discrepancy between real and "observed" positions. It is noted here that the term "observed" is used to refer not only to variables produced by a dynamic observer but also to variables produced by a PLL system.

Figure 19:
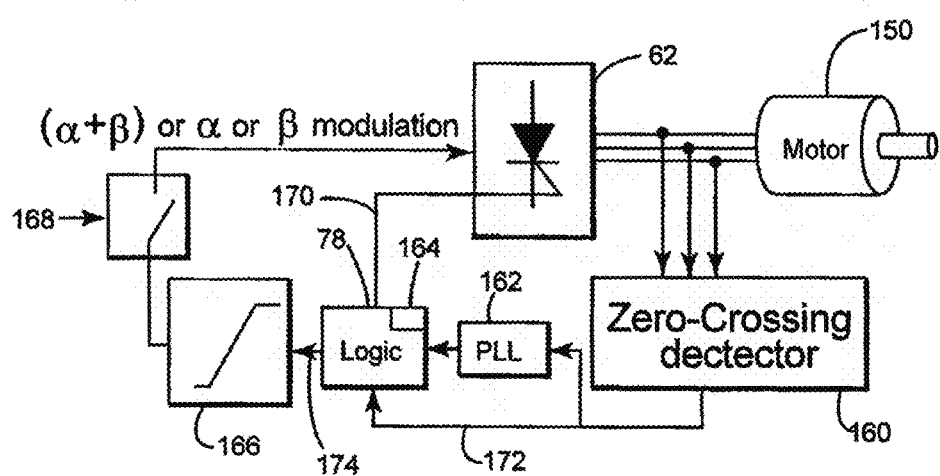
FIG. 19 is a schematic diagram of a control system for damping torsional vibrations based on one or more phase lock loop devices according to an exemplary embodiment.

According to another exemplary embodiment illustrated in FIG. 19, a fully logic method may be implemented for damping torsional oscillations in a drive train. FIG. 19 shows only the motor 150 and the LCI 62 of the drive train. With regard the exemplary embodiment illustrated in FIG. 19, the operation of PLL (or observer) 162 is of interest. In this exemplary embodiment, the PLL (or observer) is locked to the zero crossing of motor voltages (detected by block 160). However, this is not meant to be limiting the type of PLL and phase demodulator that is used or the type of dynamic observer that is used. It is noted that the PLL is considered to be a particular type of observer. For this reason, when referring to an observer, it could mean also a PLL system or when referring to a PLL it could also mean an observer. Following the zero-crossing operation in the detector 160, a digital square wave is generated and provided to the PLL/observer 162. The PLL/observer 162 tracks this waveform (zero-crossing may be replaced with other known methods). An output of the PLL/observer 162 is an instantaneous angle, which may be an analog or digital variable. The instantaneous observed angle is provided to controller 78 for determining the actuation of the angle β on the motor. For this reason, dynamic characteristics of the PLL/observer 162 have to be accurate enough to accurately track the motor rotor or the motor voltage vector position and to avoid a reduction of safety angle in case of dynamic errors.

A torsional oscillation on the drive train is reflected on a speed oscillation on the motor section and this speed oscillation is reflected on an amplitude and frequency of the motor voltages. If the PLL/observer is accurate, this speed oscillation is visible in the tracked signal.

Provided that the firing angle (α, β, or both of them) on the motor side is modulated based on a reference signal provided by the PLL/observer 162, it follows that modifying a PLL/observer transfer function may have an effect on damping torsional oscillations. For example, assume that the desired firing angle on the motor side is constant and that a torsional oscillation is present in a speed oscillation on the motor section. Firing times on the output bridge are calculated with respect to the PLL/observer output reference. If the PLL/observer does not accurately track the motor voltage (intentionally or unintentionally) and a constant firing angle is modulated based on the "observed angle" (which is different from the real angle as the PLL/observer is not accurate), the real firing angle on the motor side is modulated by the speed itself, depending on the PLL/observer transfer function. Having a modulation of the firing angle that is a response to a speed oscillation in the shaft may act as a damper.

Thus, FIG. 19 illustrates how a digital output of the PLL/observer 162 is compared in a controller 78 (e.g., logic block or the controller discussed above with regard to FIG. 9) with square-wave signals representative of motor voltages. The signals representative of the motor voltages are received by controller 78 from detector 160 along link 172. As already pointed out, zero-crossing of voltages are not the only signals related to motor/drive variables that may feed the PLL (or observer) 162. Then, through a digital operation, a correction signal is generated. Such a signal could be an analog or a digital signal. In the first case (mixed solution), the signal is sent from controller 78 along link 174 and is used to modulate the desired α and/or β angle. In the second case (digital solution), the digital signal is sent directly from controller 78 (see link 170 in FIG. 19) to gates of the inverter/converter to perform the commutation. It is noted that the operation described here (comparison between the output of the PLL/observer and input signals coming from motor) may be already embedded in the PLL (phase comparator) or observer. Controller 78 may include a control logic that is configured to verify that the correction signal on the β angle does not reduce a safety margin (unipolar modulation, as the β angle can be only reduced but not increased).

FIG. 19 also shows an optional limiter 166 that limits a value of the modulation produced by the controller 78. Optionally, a switch 168 may be provided between the limiter 166 and the LCI 62 for switching on and off the control data generated by the controller 78 which is provided to the LCI 62.

In one application, the algorithm described above for FIG. 19 may work more efficiently if the PLL/observer 162 does not accurately track the motor rotor or the motor voltage vector position. Modifying the PLL/observer transfer function to damp oscillations in an attempt to have a visible difference between "observed" and real positions may have a series of drawbacks (including possible reduction of safety angle).

For this reason, inside the controller 78, a second PLL/observer 164 may be provided. In this way, the first PLL/observer 162 may be accurate enough to track the motor rotor or the motor voltage vector position, while the second PLL/observer 164 is configured to follow the motor rotor or voltage vector position with a different dynamic (that now can be chosen without many restrictions). In steady state, at constant speed, the output of the two PLL/observers' may be the same, while during transients (including oscillations in speed around a center value) the outputs of the two PLL/observers are different. The result of comparison between the two PLL/observers' may be used to implement another damping solution.

In the case in which two PLL/observers are used, both the mixed solution is possible (e.g., angle β is modulated by changing the β reference value) or the fully digital solution is possible (a comparison of the two digital signals coming from the two PLL/observers' is digitally processed and the result of the comparison is a command sent directly to the gate units of the inverter without any direct modulation on the β angle reference value).

According to an exemplary embodiment, a method for damping a torsional vibration in a drive train including an electrical machine is illustrated in FIG. 20. The method includes a step 2000 of receiving converter data related to variables of the converter (e.g. zero crossing), a step 2002 of receiving a first digital signal from a first phase lock loop device or a dynamic observer, a step 2004 of comparing the converter data with the first digital signal, a step 2006 of generating control data for a rectifier and/or an inverter of the converter for damping a torsional oscillation in a shaft of the drive train based on a result of the comparison, and a step 2008 of sending the control data to the rectifier and/or to the inverter for modulating an active power exchanged between the converter and the electrical machine. In optional steps, the control data is digital and is sent directly to the converter for commutating gates of the converter or the control data is analog and is used for producing α-, β-, or α- and β-modulation to be applied to the converter modulator.

However, if two PLL (or observer) units are made available in the system, then a different method may be implemented for damping a torsional vibration in a drive train including an electrical machine. According to this embodiment illustrated in FIG. 21, the method includes a step 2100 of receiving a first digital signal from a first phase lock device or first dynamic observer, a step 2102 of receiving a second digital signal from a second phase lock loop device or a second dynamic observer, a step 2104 of comparing the first digital signal with the second digital signal, a step 2106 of generating control data for a rectifier and/or an inverter of the converter for damping a torsional oscillation in a shaft of the drive train based on a result of the comparison, and a step 2108 of sending the control data to the rectifier and/or to the inverter for modulating an active power exchanged between the converter and the electrical machine. In optional steps, the control data is digital and is sent directly to the converter for commutating gates of the converter or the control data is analog and is used for producing α-, β-, or α- and β-modulation to be applied to the converter modulator.

The disclosed exemplary embodiments provide a system and a method for damping torsional vibrations. It should be understood that this description is not intended to limit the invention. On the contrary, the exemplary embodiments are intended to cover alternatives, modifications and equivalents, which are included in the spirit and scope of the invention as defined by the appended claims. For example, the method may be applied to other electric motor driven mechanical systems, such as large water pumps, pumped hydro power stations, etc. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A torsional mode damping controller system connected to a converter or placed inside the converter itself, the converter driving a drive train including an electrical machine and a non-electrical machine, the controller system comprising:
an input interface configured to receive convener data related to variables of the converter; and
a controller connected to the input interface and configured to,
receive a first digital signal from a first phase lock loop device or a dynamic observer,
receive the converter data from the converter,
compare the converter data with the first digital signal,
generate control data for at least one of a rectifier and an inverter of the converter for damping a torsional oscillation in a shaft of the drive train based on a result of the comparison, and
send the control data to the at least one of the rectifier and the inverter for modulating an active power exchanged between the converter and the electrical machine.

2. The controller system of claim 1, wherein the control data is digital and is sent directly to at least one of a converter modulator and gate units for commutating gates of the converter.

3. The controller system of claim 1, wherein the control data is analog and is used for producing α-, β-, or α- and β-modulation to be applied to converter modulators.

4. The controller system of claim 1, wherein the variables of the converter include a voltage or a current supplied to the motor.

5. The controller system of claim 1, wherein the converter data is related to a zero value of an alternating voltage or current.

6. The controller system of claim 1, wherein the controller is configured to generate the control data based only on the converter data.

7. A torsional mode damping controller system connected to a converter or placed inside the converter itself, the converter driving a drive train including an electrical machine and a non-electrical machine, the controller system comprising:
a first input interface configured to receive a first digital signal from a first phase lock device or a first dynamic observer;
a second input interface configured to receive a second digital signal from a second phase lock device or a second dynamic observer; and
a controller connected to the first and second input interfaces and configured to,
receive the first and second digital signals,
compare the first digital signal with the second digital signal, generate control data for at least one of a rectifier and an inverter of the converter for damping a torsional oscillation in a shaft of the drive train based on a result of the comparison, and send the control data to the at least one of the rectifier and the inverter for modulating an active power exchanged between the converter and the electrical machine.

8. A system for driving an electrical machine that is part of a drive train, the system comprising:

a rectifier configured to receive an alternatives current from a power source and to transform the alternative current into a direct current;

a direct current link connected to the rectifier and configured to transmit the direct current;

an inverter connected to the direct link and configured to change a received direct current into a alternative current;

an input interface configured to receive converter data related to variables of a converter; and a controller connected to the input interface and configured to, receive a first digital signal from a first phase lock loop device or a dynamic server, receive the converter data from the converter, compare the converter data with the first digital signal, generate control data for at least one of a rectifier and an inverter of the converter for damping a torsional oscillation in a shaft of the drive train based on a result of the comparison, and send the control data to the at least one of the rectifier and the inverter for modulating, an active power exchanged between the converter and the electrical machine.

9. A method for damping a torsional vibration in a drive train including an electrical machine, the method comprising:

receiving converter data related to variables of a converter;

receiving a first digital signal from a first phase lock loop device or a dynamic observer;

comparing the converter data with the first digital signal;

generating control data for at least one of a rectifier and an inverter of the converter for damping a torsional oscillation in a shaft of the drive train based on a result of the comparison; and sending the control data to the at least one of the rectifier and the inverter for modulating an active power exchanged between the converter and the electrical machine.

10. A method for damping a torsional vibration in a drive train including an electrical machine, the method comprising:

receiving, a first digital signal from a first phase lock device or a first dynamic observer;

receiving a second digital signal from a second phase lock loop device or a second dynamic observer additional to the first phase lock device or the first dynamic observer;

comparing the first digital signal with the second digital signal;

generating control data for at least one of a rectifier and an inverter of a converter for damping a torsional oscillation in a shaft of the drive train based on a result of the comparison; and sending the control data to the at least one of the rectifier and the inverter for modulating an active power exchanged between the converter and the electrical machine.

* * * * *